United States Patent
Choi et al.

(10) Patent No.: US 8,025,826 B2
(45) Date of Patent: Sep. 27, 2011

(54) GLASS/POLYVINYLBUTYRAL LAMINATES HAVING DIRECTIONAL SURFACE PATTERNS AND A PROCESS FOR PREPARING SAME

(75) Inventors: Chul Won Choi, Ulsan (KR); Sang Gyu Lee, Seoul (KR)

(73) Assignee: E.I. du Pont de Nemours and Company, Wilmington, DE (US)

( * ) Notice: Subject to any disclaimer, the term of this patent is extended or adjusted under 35 U.S.C. 154(b) by 118 days.

(21) Appl. No.: 12/507,273

(22) Filed: Jul. 22, 2009

(65) Prior Publication Data

US 2009/0277573 A1 Nov. 12, 2009

Related U.S. Application Data

(63) Continuation of application No. 11/335,959, filed on Jan. 20, 2006, now abandoned, which is a continuation-in-part of application No. 10/204,128, filed on Aug. 14, 2002, now abandoned.

(51) Int. Cl.
*B28B 3/20* (2006.01)
(52) U.S. Cl. .................................................. 264/176.1
(58) Field of Classification Search ............... 264/176.1
See application file for complete search history.

(56) References Cited

U.S. PATENT DOCUMENTS

| | | | |
|---|---|---|---|
| 2,489,951 A | 11/1949 | Bump | |
| 3,994,654 A * | 11/1976 | Chyu | 264/176.1 |
| 4,452,840 A | 6/1984 | Sato et al. | |
| 4,654,179 A | 3/1987 | Cartier et al. | |
| 4,925,725 A | 5/1990 | Endo et al. | |
| 5,151,234 A | 9/1992 | Ishihara et al. | |
| 5,425,977 A | 6/1995 | Hopfe | |
| 5,455,103 A | 10/1995 | Hoagland et al. | |
| 5,626,809 A | 5/1997 | Mortelmans | |
| 6,048,939 A * | 4/2000 | Priester | 264/176.1 |
| 6,077,374 A | 6/2000 | Hopfe | |
| 6,093,471 A * | 7/2000 | Hopfe et al. | 428/141 |
| 2003/0012964 A1 | 1/2003 | Choi et al. | |

FOREIGN PATENT DOCUMENTS

| | | |
|---|---|---|
| EP | 0211819 | 2/1987 |
| EP | 0215976 | 4/1987 |
| EP | 0390578 | 10/1990 |
| EP | 1 268 196 | 9/2004 |
| JP | 2002-261620 | 10/1990 |
| JP | 2002-301417 | 12/1990 |
| JP | 2009-508078 | 8/1997 |
| JP | 2002-261620 | 9/2002 |
| JP | 2009-508078 | 2/2009 |
| JP | 2009-301417 | 10/2009 |

(Continued)

OTHER PUBLICATIONS

Response dated Jul. 24, 2006, to Oppostlon filed by Kuraray Specialities Europe GmbH against European counterpart EP 1 268 196 B1, including amended claims.

(Continued)

*Primary Examiner* — Yogendra Gupta
*Assistant Examiner* — Alison Hindenlang

(57) ABSTRACT

De-airing of PVB/glass laminates can be improved, while haze in the pre-press is minimized and sleep time reduced as a result using a PVB sheet having a roughened surface with directionality. A roughened surface with a washboard pattern that is useful in this regard can be obtained by varying certain conditions of a melt-fracture extrusion process.

6 Claims, 2 Drawing Sheets

FOREIGN PATENT DOCUMENTS

WO 0172510 A1 10/2001

OTHER PUBLICATIONS

Opposition filed by Kuraray Specialities Europe GmbH against European counterpart EP 1 268 196 B1.
Michaeli, Extrusionwerkzeuge fur Kunststoffe usw ("Extrusion tools for plastics etc..").
HT Troplast AG invoice cited in Opposition as E6.
HT Troplast AG invoice cited in Opposition as E7.
Test results submitted in Opposition as E8.
Figure submitted in Opposition as E3.
Figure submitted in Opposition as E4.
Figure submitted in Opposition as E5.
International Preliminary Examination Report from PCT Counterpart PCT/US01/10023.
Written Opinion from PCT Counterpart PCT/US01/10023.
International Search Report from PCT Counterpart PCT/US01/10023.
File History: EP 1 268 196.

* cited by examiner

GLASS/POLYVINYLBUTYRAL LAMINATES HAVING DIRECTIONAL SURFACE PATTERNS AND A PROCESS FOR PREPARING SAME

CROSS REFERENCE TO RELATED APPLICATION

This application is a continuation of pending U.S. application Ser. No. 11/335,959 filed Jan. 20, 2006, which is a continuation in part of U.S. application Ser. No. 10/204,128 filed Mar. 29, 2001, now abandoned.

BACKGROUND OF THE INVENTION

1. Field of the Invention

The present invention relates to glass laminates. The present invention particularly relates to laminates of glass and polyvinylbutyral, and a process of preparing same.

2. Description of Related Art

Glass laminates that include plasticized polyvinyl butyral (PVB) interlayers can be used in various applications, including use in automotive safety glass applications such as windshields and side glass; in architectural applications such as windows, doors and/or building panels; and in various other applications such as in display cases, as shelving, and the like.

Glass/PVB laminates can be prepared by conventional methods. Typically, a laminate can be prepared by first positioning a sheet of PVB between two pieces of glass to obtain an assembly, and trimming the excess PVB interlayer. A "pre-press" is obtained from the assembly by removing air trapped between the glass and the interlayer, and then sealing the edges. A conventional method for edge sealing requires placing the assembly inside of a rubber bag and removing the air from the bag by applying vacuum. The rubber bag and contents can then be passed through a furnace wherein the temperature is increased to about 135° C. in order to obtain the pre-press. A pre-press so obtained can be heated in an autoclave wherein heat and pressure are applied, residual air is dissolved in the PVB interlayer, and bonding occurs between the interlayer and the surface being laminated.

An interlayer having a smooth surface can present problems during the assembly and de-airing steps of a lamination process if a vacuum bag system is used to make the pre-press. In the assembly step, the smooth pattern allows the interlayer to tack too easily to the glass, making placement of the interlayer difficult. In the de-airing step, a smooth pattern can lead to a laminate having trapped air, and flaws in the laminate can result therefrom. It is known that interlayers having a rough surface can facilitate de-airing. Rough surface patterns can be generated by conventional methods, including use of an embossing tool to impart a reproducible pattern on the surface of the interlayer material. It is also conventional to generate a randomly irregular surface pattern by a melt-fracture process, which can provide channels by which air can escape during the lamination process.

In a typical windshield laminating process, the PVB interlayer is first subjected to a shaping step wherein the PVB interlayer is differentially stretched such that the shaped interlayer better conforms to the curvature of the vehicle for which the windshield is designed. In the shaping step, the PVB roll is unwound, and the interlayer is heated to approximately 100° C. and then passed over one or more cones which are smooth, and then chilled to approximately 10° C. for storage, and then cut into blanks slightly larger than the size of the windshield. Stresses incurred in the shaping process are partially relaxed as the blanks are conditioned at 10° C. During the shaping step, some of the pattern roughness is pressed out temporarily, but will recover according to stress relaxation kinetics well known in the art of polymer rheology.

For interlayers with surface patterns generated in a melt-fracture process, haze in a pre-press can be a problem, especially if the interlayer material is used within twelve hours of being shaped for lamination in a vacuum bag pre-pressing system. Pre-presses with less than 15% light transmission are typically rejected. Use of an embossing tool can be effective in resolving the de-airing and pre-press clarity concerns, but is more costly and more work intensive than use of a melt fracture process. An embossing process is inflexible relative to the melt fracture process, with respect to producing different patterns on the same equipment.

While use of rough patterns obtained by a melt-fracture process could improve the effectiveness of de-airing by vacuum, rough patterns generated by melt fracture require more energy to melt down in the heating step. This could render the pre-press hazier than if it had been made from a smoother interlayer. In a conventional process for making flat laminates, a glass/PVB/glass assembly is typically heated to the point where the PVB attains a temperature of abut 50-90° C. At this temperature, the entire assembly is passed through a set of nip rolls, and the nip rolls exert pressure that squeezes out the interstitial air and also seals the edges of the pre-press. Pre-presses that use conventional PVB with a roughened surface obtained by a melt fracture process tend to be hazy if $R_z$ is above 30 micrometers.

It is desirable to obtain an interlayer material with a surface rough enough to minimize haze in a pre-press, yet maintain a desirable balance of physical properties of the interlayer, without requiring the capital investment, loss of yield, loss of flexibility, or possible contamination that can result from use of an embossing tool. Therefore it can be desirable to obtain such a rough surface without use of an embossing tool.

SUMMARY OF THE INVENTION

In one aspect, the present invention is a plasticized polyvinyl butyral sheet having a directional surface pattern created using a melt fracture process during extrusion of the sheet.

In another aspect, the present invention is a plasticized polyvinyl butyral sheet having a washboard surface pattern created using a melt fracture process during extrusion of the sheet.

In another aspect, the present invention is a plasticized polyvinyl butyral sheet having a herringbone surface pattern created using a melt fracture process during extrusion of the sheet.

In another aspect, the present invention is a process for creating a directional pattern on a surface of a plasticized polyvinyl butyral sheet using a melt fracture process during extrusion of the sheet.

In still another aspect, the present invention is a laminate comprising a plasticized polyvinyl butyral interlayer, wherein the interlayer is obtained from a polyvinyl butyral sheet having a directional surface pattern created using a melt fracture process during extrusion of the sheet.

DETAILED DESCRIPTION

Figure 1:
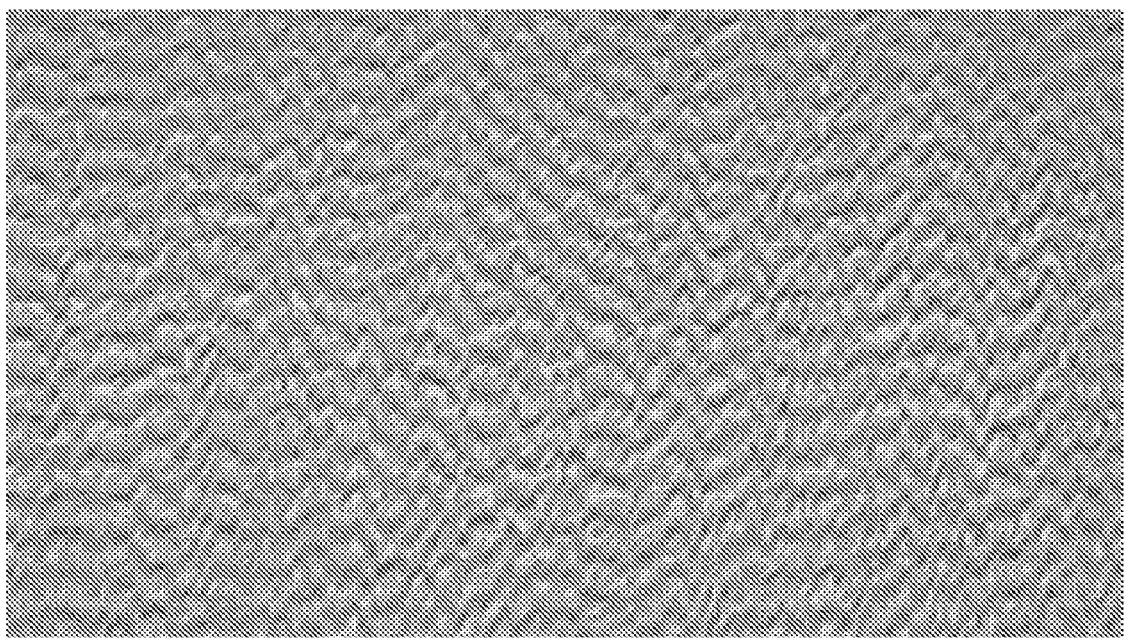
FIG. 1 is a grey scale image of a portion of the upper surface of a polyvinyl butyral sheet having a herringbone pattern.

In one embodiment, the present invention is a plasticized polyvinyl butyral (PVB) sheet having a roughened surface wherein the surface has directionality imparted by a melt fracture extrusion process. PVB sheeting of the present invention is plasticized. Conventional plasticizers known in the art of preparing PVB sheets can be used in the practice of the present invention. Such plasticizers include, but are not limited to: triethylene glycol-di-2-ethyl butyrate; triethylene glycol-di-2-ethyl hexanoate; and dibutyl sebacate.

The roughness of the surface of a PVB sheet of the present invention is such that haze in a glass/PVB pre-press is low even if the PVB is used within 12 hours after it is stretched. Surface roughness can be measured by conventional methods, and can be expressed by the term $R_z$. In a washboard PVB sheet of the present invention $R_z$ is greater than about 30 micrometers, as determined by ISO R468. Preferably a washboard pattern of the present invention has a roughness of greater than about 35, more preferably greater than about 40 and most preferably from about 35 to about 100. In a herringbone pattern of the present invention, the $R_z$ is less than about 35, preferably less than about 30, more preferably from about 15 to about 35, and most preferably from about 20 to about 35 micrometers. In a PVB sheet of the present invention, the rough surface has a directional pattern, and the rough directional pattern is obtained without use of an embossing tool.

In another embodiment, the present invention is a laminate comprising at least one layer of PVB and at least one layer of glass, wherein the PVB layer is obtained by an extrusion process wherein a roughened PVB surface having directionality is obtained without use of an embossing tool. The laminate is prepared according to conventional methods, wherein an assembly comprising at least one layer of PVB of the present invention is heated, and then de-aired under vacuum and at elevated temperature to form a pre-press. Alternatively, the laminate can be prepared by heating the assembly in an oven and then passing it through one or more pairs of nip rolls. The pre-press can be autoclaved according to conventional methods and conditions to yield a finished laminate article.

In still another embodiment, the present invention is a process for preparing a PVB sheet having a roughened surface having directionality imparted using a melt fracture extrusion process, without the aid of an embossing tool. Directionality, as the term is used herein, refers to the tendency of a roughened pattern of the present invention to have an ordered, repetitive pattern that gives the appearance of an embossed pattern. However, such a pattern is obtained without using an embossing tool. As such, problems associated with use of an embossing tool are eliminated. Problems associated with use of an embossing tool include, for example, surface defects and material loss caused by adhesion of the sheet material to the tool. A directional surface pattern of the present invention provides ordered channels that are formed by a continuous alignment of the troughs of roughened surface to provide substantially uninterrupted channels for airflow. Uninterrupted channels in a surface pattern can provide the benefit of more efficient "de-airing" in a lamination process than a surface pattern having a random array of peaks and valleys. An extruded sheet of the present invention, viewed on a 3-dimensional axis wherein the height and depth of the surface pattern is shown on the y-axis, the sheet length as it is extruded from the extruder is shown on the x-axis, and the depth of the sheet in the cross-web direction is represented on the z-axis, has channels that run in the cross-web direction and that are substantially uninterrupted by the random occurrence of a raised portion of the surface blocking the channel.

The present invention provides a process for obtaining a non-random pattern having substantially uninterrupted channels in the cross-web direction without use of an embossing tool.

The process comprises varying certain conditions and parameters in the extrusion process of PVB sheeting material. To prepare conventional PVB sheeting material, typically parameters can be varied to control surface pattern. Some parameters that can be varied are die body temperature and die gap, sheet caliper, lip stream pressure, lip gap, air gap, content of plasticizer, temperature of polymer, throughput of molten polymer per unit die width, and temperature of quench water. Other parameters can be varied as well. The directional patterns of the present invention can be obtained in the process of the present invention by varying the die pressure.

Figure 2:
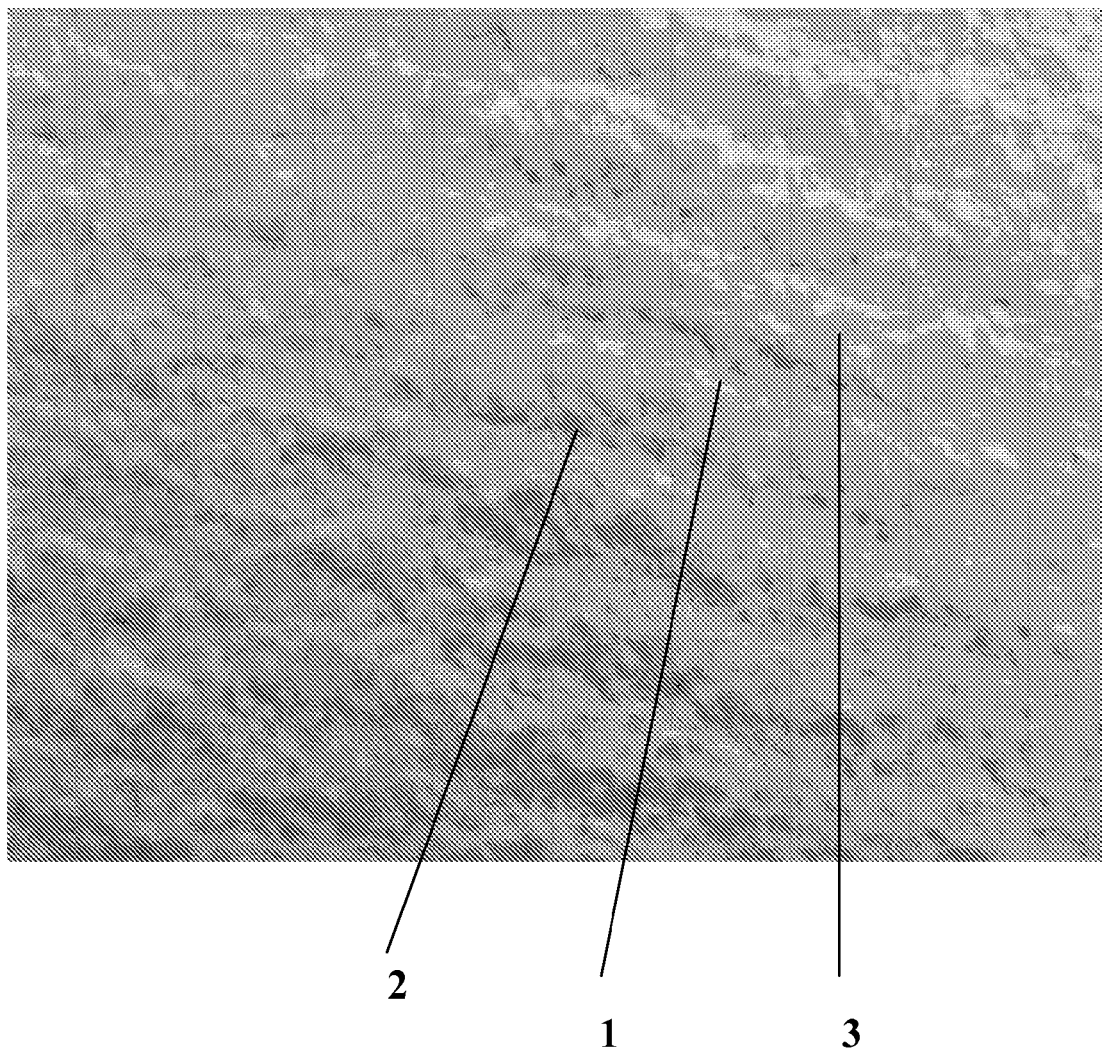
FIG. 2 is a grey scale image of a portion of the upper surface of a polyvinyl butyral sheet having a washboard pattern.

Under certain die pressure operating conditions, a washboard pattern is one type of directional pattern that can be obtained on the PVB surface. A herringbone pattern is a second type of directional surface pattern that can be obtained in the process of the present invention by varying process conditions. The herringbone and washboard patterns are shown in FIG. 1 and FIG. 2, respectively. By "washboard pattern" it is meant a regular pattern having substantially uninterrupted channels wherein the troughs, or surface depressions, of an extruded sheet are aligned in the cross-web direction to form substantially straight lines. The lines can run parallel to the front edge of the extruded sheet, or can be at an angle of from about 1° to about 45°. For example, a washboard pattern can be obtained by operating at a die pressure of greater than 58 kg/cm² (5.69 MPa). As shown in FIG. 2, a washboard pattern or surface, as the term is used herein, describes a surface having alternately high (1) and low (2) areas of elevation that form ridges (3), similar to the surface of a washboard. The ridges on a PVB surface of the present invention can be nearly parallel to the cross-web direction of the sheeting as it is extruded, the cross-web direction being the direction perpendicular to that of the extrusion. Under certain other conditions of die pressure, a herringbone pattern can be obtained on the PVB surface. By "herringbone pattern" it is meant a regular pattern having substantially uninterrupted channels wherein the troughs, or surface depressions, of an extruded sheet are aligned in the cross-web direction to form channels that appear to regularly change direction up and down in an alternating pattern, passing through a mid-line, and creating the appearance of "zig-zag" channels. For example, a herringbone pattern can be obtained by varying die pressure such that the pressure is below 37 kg/cm² (3.63 MPa). Other patterns can be obtained by varying process conditions, but the directional patterns of the present invention are controlled primarily by the die pressure.

Throughput (rate of polymer through the die) can be in the range of from about 600 to about 1000 kg per hr per meter, depending on the equipment being used.

EXAMPLES

The Examples and comparative examples herein are included for illustrative purposes only, and are not intended to limit the scope of the present invention.

In Examples 1-25, 100 parts of dry PVB flake of nominally 18-23% by weight of un-butyralated vinyl alcohol groups were mixed with 35-40 parts of tetraethylene glycol di-n-heptanoate plasticizer and one or more light stabilizers marketed under the tradename "Tinuvin" by Ciba-Geigy Co. and an antioxidant which were pre-mixed in the plasticizer continuously in a twin-screw extruder. The melt was forced through a slot die and formed a sheeting of 0.76 mm nominal thickness. In addition, agents for modifying surface energy of the bulk interlayer and usual adjuvants such as antioxidants, colorants and ultraviolet absorbers which do not adversely affect the functioning of the surface energy modifying agent and adhesion control agent can be included in the PVB composition. The melt at the die is at approximately 200-220° C. The lips of the die are heated by injecting pressurized steam into cavities therein. The lip temperature is controlled by the pressure of the steam injected. One of the die lips is adjustable so that as it opens, the back-pressure in the die is decreased and vice versa. The position of this lip is computer-controlled, and a desired back-pressure in the die (die pressure) is used as input.

PVB sheeting having washboard or herringbone pattern was prepared on conventional extrusion equipment by varying the condition of die pressure. The same equipment was used for all of the examples. The conditions and results are given in the Table below.

TABLE

| Ex. No. | Washboard (W) or Herringbone (H) or Random (R) | Die Pressure (kg/cm$^2$) | Lip Steam Pressure (kg/cm$^2$) | $R_z$ (average) (micrometers) |
| --- | --- | --- | --- | --- |
| 1 | W | 58.8 | 6.5 | 62.8 |
| 2 | H | 35.5 | 6.5 | 24.4 |
| 3 | H | 35.5 | 6.5 | 24.7 |
| 4 | H | 33.5 | 6.5 | 29.0 |
| 5 | H | 31.5 | 6.5 | 27.2 |
| 6 | H | 29.2 | 6.5 | 24.4 |
| 7 | H | 33.6 | 6.5 | 28.1 |
| 8 | H | 33.4 | 6.5 | 27.6 |
| 9 | H | 33.8 | 15 | 26.7 |
| 10 | H | 34.1 | 15 | 26.6 |
| 11 | H | 36.0 | 15 | 24.3 |
| 12 | R | 62.9 | 15 | 47.9 |
| 13 | R | 63.0 | 10 | 75.2 |
| 14 | W | 62.8 | 6.5 | 80.0 |
| 15 | W | 58.2 | 6.5 | 54.5 |
| 16 | W | 58.4 | 6.5 | 63.9 |
| 17 | W | 59.3 | 6.5 | 60.5 |
| 18 | W | 58.5 | 6.5 | 65.1 |
| 19 | W | 58.7 | 6.5 | 60.2 |
| 20 | W | 58.6 | 6.5 | 65.1 |
| 21 | W | 58.7 | 6.5 | 66.5 |
| 22 | W | 60.3 | 6.5 | 73.3 |
| 23 | W | 60.0 | 6.5 | 70.9 |
| 24 | W | 58.4 | 6.5 | 59.8 |
| 25 | W | 60.1 | 6.5 | 81.9 |

Comparative Example 26

Twenty full size windshields were prepared using a PVB interlayer commercially available from DuPont under the trade name Butacite® BE-1120 with a random surface pattern generated by melt fracture. The die pressure used was 62.9 kg/cm$^2$ (61.7 MPa), lip steam pressure was 15 kg/cm$^2$ (14.7 MPa). The roughness in terms of Rz was 47.9 micrometers, but there was no directionality. The interlayer was shaped using typical shaping equipment, and the shaped interlayer was allowed to recover at about 15° C. for 4 hours. The pre-presses were prepared using a commercial vacuum-bag system with approximately 5 minutes of vacuum at ambient temperature, and 10 minutes inside an oven in which the PVB temperature gradually rose to about 100° C. at the end of that period. Ten of the pre-presses were very hazy, and were judged to be unusable (50% yield).

Comparative Example 27

Another twenty full size windshields were made of the same interlayer as in Comparative Example 26 except that the shaped interlayers had 8 hours of recovery after shaping. Five of the pre-presses were judged unusable (75% yield). This example shows that longer recovery time improves pre-press yield.

Example 28

Twenty windshields were prepared using the procedure in Comparative Example 26, except that the interlayer had washboard pattern, and Rz was 62.8 micrometer. It was made with die pressure of 58.8 kg/cm2 (57.7 MPa) and lip steam pressure of 6.5 kg/cm$^2$ (6.4 MPa). The interlayer had 4 hours of recovery time after shaping before it was assembled. One of the twenty pre-presses was judged unusable (95% yield). The pre-press yield was much higher than that in Comparative Example 26 although the sheeting was rougher, leading one skilled in the art to suspect that the pre-press would be hazier.

Example 29

Twenty windshields were prepared as in Example 28, except that the interlayer had 8 hours of recovery time after shaping before it was assembled. None of the twenty windshields was judged unusable (100% yield).

The invention claimed is:

1. A process for creating a directional pattern on a surface of a polyvinyl butyral sheet comprising the step of extruding molten polyvinyl butyral using a melt fracture extrusion process, wherein the pattern can be controlled by varying extruder die pressure and wherein an embossing tool is not used, characterized in that the directional pattern is a herringbone pattern that is created using a die pressure of from 29.2 to 36.0 kg/cm$^2$.

2. A process of claim 1 additionally characterized in that extruder lip steam pressure is 15 kg/cm$^2$ or less.

3. A process of claim 2 wherein the lip steam pressure is 10 kg/cm$^2$ or less.

4. A process for producing a laminate comprising the steps of

A. forming a polyvinyl butyral sheet having a directional surface pattern by extruding molten polyvinyl butyral using a melt fracture extrusion process, wherein the pattern can be varied by varying extruder die pressure and wherein an embossing tool is not used, characterized in that the directional pattern is a herringbone pattern created using a die pressure of from 29.2 to 36.0 kq/cm$^2$; and B. forming a layered assembly comprising said polyvinyl butyral sheet by contacting said polyvinyl butyral sheet with at least one layer of glass;

C. forming a pre-press by heating and de-airing said layered assembly under vacuum; and D. heating said pre-press in an autoclave while applying heat and pressure to bond said polyvinyl butyral sheet and said at least one glass layer, thereby forming a laminate.

5. A process of claim 4 wherein the layered assembly is heated to a temperature of at least 100° C. during formation of the pre-press.

6. A process of claim 4 wherein the polyvinyl butyral layer is differentially stretched during formation of the pre-press.

* * * * *